July 6, 1948.  E. M. ANDERSON ET AL  2,444,414
FLUID COUPLING
Filed Sept. 27, 1946  2 Sheets-Sheet 1
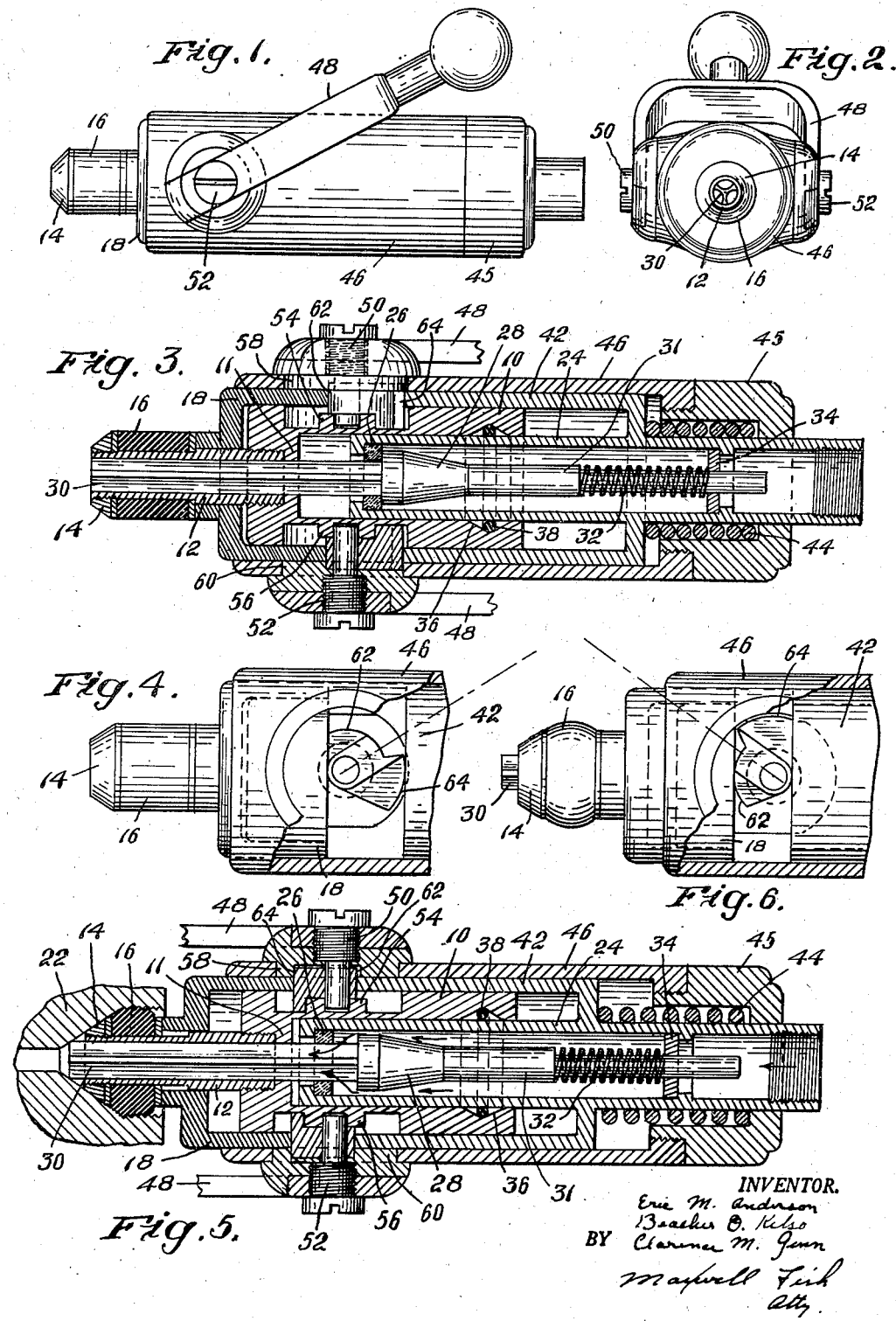
INVENTOR.
Eric M. Anderson
Beacher O. Kelso
BY Clarence M. Gunn
Maxwell Fish
Atty.

July 6, 1948.  E. M. ANDERSON ET AL  2,444,414
FLUID COUPLING
Filed Sept. 27, 1946  2 Sheets-Sheet 2
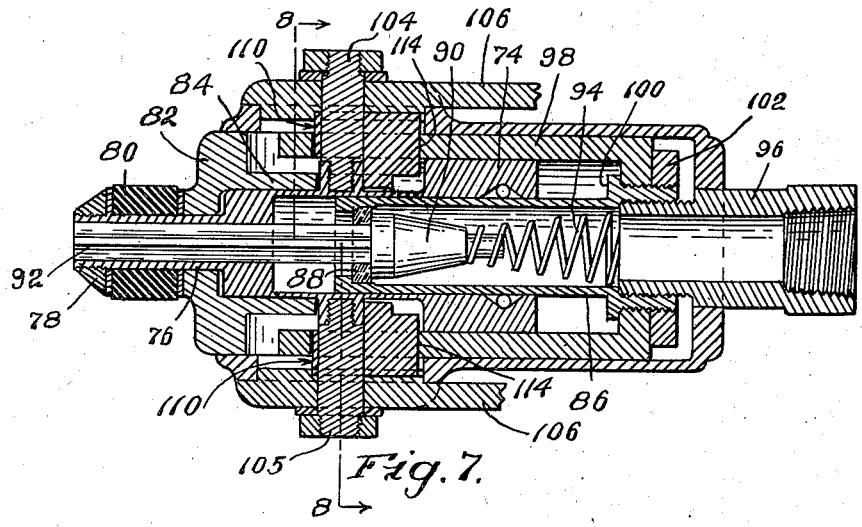
Fig. 7.
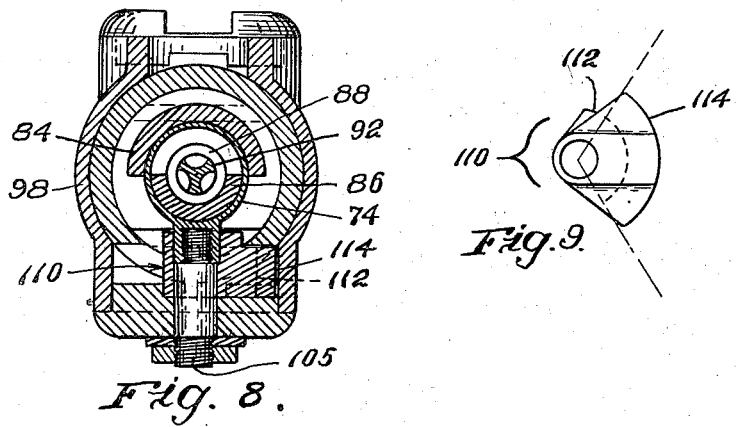
Fig. 8.
Fig. 9.
INVENTOR.
Eric M. Anderson
BY Bucker O. Kilso
Clarence M. Ginn
Maxwell Fish
Atty.

Patented July 6, 1948

2,444,414

UNITED STATES PATENT OFFICE 2,444,414

FLUID COUPLING

Eric Martin Anderson, Westbrook, and Beecher Olen Kelso and Clarence Milton Ginn, Portland, Maine, assignors to Utilities Distributors, Inc., a corporation of Maine Application September 27, 1946, Serial No. 699,796

13 Claims. (Cl. 284—18)

The present invention relates to improvements in fluid couplings, and more particularly to an improved detachable valve-coupling unit adapted to be coupled to a nipple for the transfer of a gaseous fluid under pressure through the coupling and associated nipple.

It is a principal object of the invention to provide an improved valve-coupling unit which is of simple construction and is adapted to be quickly and firmly attached to any nipple of standard type having an internal screw thread which would normally receive an externally threaded coupling member.

It is another object of the invention to provide a novel gripping means for use in a valve-coupling unit of the general type herein described, which is capable of being instantly expanded by the simple manipulation of a manually operable lever or other part into gripping and sealing engagement with the internally threaded bore of the nipple.

It is a further object of the invention to provide a novel and improved valve-coupling unit including means for gripping the nipple to be coupled and a valve assembly operable to permit the flow of the gaseous medium under pressure through the coupling, which is particularly constructed and arranged to provide an adequate seal between the movable and stationary parts of the valve unit and also between the parts to be coupled to avoid any possibility of gas leakage either during use or upon disconnecting of the unit.

The valve-coupling unit illustrated in the drawings as embodying in a preferred form the several features of the invention, comprises generally a cylindrical casing or supporting body for the unit, a gripping and sealing device for firmly attaching and for sealing the coupling unit to a nipple, a shut-off valve, and a manual control element or handle which acts when moved from an off to an on position to perform in sequence the operations of attaching the coupling unit to the nipple, sealing the coupled parts so that any possibility of escape of gas is avoided, and finally of opening the valve to permit the unimpeded flow of gas through the coupling. Movement of the manual control element or lever to its off position is effective to perform in the reverse sequence the operations of shutting off the valve, and thereafter of releasing and unsealing the unit from the nipple.

A feature of the invention consists in the provision of a novel and improved gripping and sealing device which comprises an expandable washer of rubber or similarly elastic material which is capable of being bulged outwardly into engagement with the internal screw thread of a standard nipple or fitting. Since nipples of this description are uniformly provided with an internally threaded connection of standard diameter, the gripping device of the present invention has the advantage that it is readily applied to all such fittings now in commercial use regardless of external shape or design. The gripping and sealing device of the present construction has the further advantage that it provides a rapid and extremely effective means for sealing the coupled elements against any possible loss or leakage of gas while the coupling unit is in use.

Another feature of the invention consists in the improved and substantially simplified construction and operation of the unit wherein the functions of gripping and sealing the unit to a nipple and the function of opening the valve are performed by means of axially shiftable control sleeves which are in turn operated from a manually operable control element or lever to perform the several operations in the desired sequence.

With the above noted and other objects in view as may hereinafter appear, the several features of the invention consist also in the devices, combinations and arrangement of parts hereinafter described and claimed, which together with the advantages to be obtained thereby will be readily understood by one skilled in the art from the following description taken in connection with the drawings, in which Fig. 1 is a view in side elevation of a valve-coupling unit embodying in a preferred form the several features of the invention; Fig. 2 is an end view of the valve illustrated in Fig. 1, looking from the left; Fig. 3 is a mid-sectional plan view of the valve-coupling unit shown in Fig. 1, with the handle in its retracted inoperative or closed position; Fig. 4 is a fragmentary view in side elevation partly in section, to illustrate particularly the operating cams for actuating the expandable gripping means to secure a gripping and sealing engagement of the unit with the nipple to be coupled, and for controlling the position of the shut-off valve within the unit, the parts being in the positions shown in Fig. 3; Fig. 5 is a mid-sectional plan view similar to Fig. 3, but with the parts shown in the operative on or open position of the valve-coupling unit; Fig. 6 is a fragmentary view in side elevation similar to Fig. 3, but illustrating the position of the cams for the operative on or open position of the valve-coupling unit as shown in Fig. 5; Fig. 7 is a mid-sectional plan view of the valve-coupling unit illustrating an alternative construction of the unit in which cam means are provided which operate positively in both directions to move the shut-off valve assembly between its closed and open positions; Fig. 8 is a sectional view taken on the line 8—8 of Fig. 7, illustrating particularly the construction and arrangement of the operating cams and associated parts; and Fig. 9 is a detail view of one of the two identical operating cams employed in the construction shown in Figs. 7 and 8.

Referring to the drawings, Figs. 1 to 6 inclusive, illustrate one form of valve-coupling unit embodying the several features of the invention. The unit comprises a cylindrical casing 10 which is formed at its forward end with an inwardly extending flange screw-threaded to receive a tubular extension 12 of small diameter. A ring member 14 is screw-threaded to the forward end of the extension 12.

The gripping and sealing mechanism provided for attaching the coupling unit to a nipple to be coupled, comprises a nipple gripping collar 16 sleeved on the extension 12 and abutting at its forward end against the ring member 14. The collar 16 is formed of an elastic material which is preferably rubber, although other materials having similar qualities of elasticity, toughness and resistance to erosion by action of the gas may be employed, so that the collar when compressed endwise will bulge outwardly. It will be understood that while rubber is preferred as a material for the collar, other materials such as synthetic rubber having similar qualities of elasticity, toughness and resistance to erosion by action of the gas may be employed. The collar 16 is arranged to be acted upon by means of an axially shiftable gripper control sleeve 18 having one end thereof of relatively small diameter sleeved on the tubular extension 12, and the other end thereof of larger diameter sleeved to the outer periphery of the cylindrical casing 10. Axial movement of the sleeve 18 from the inoperative off position shown in Fig. 3 leftwardly to the operative on or gripping position shown in Fig. 5, causes the collar 16 to be compressed axially against the flanged member 14, so that it is bulged outwardly into a tight fitting engagement with the internal screw threads of a nipple 22 as generally indicated in Fig. 5. The gripping mechanism above described including the expandable collar 16 provides a simple and extremely powerful means for coupling the valve unit to the nipple, and is capable of resisting very substantial pressures without showing any tendency toward breakdown of the coupling. The collar 16 when expanded into engagement with the screw-threaded nipple serves also to provide a gas-tight seal between the unit casing and the extension 12 on the one hand and the nipple to be coupled on the other hand.

The shut-off valve mechanism provided with the coupling unit shown in Figs. 1 to 6, comprises a cylindrical gas conduit member 24 which projects within the casing 10 and is arranged to slide relatively thereto. At its forward end the member 24 is formed with an inwardly extending flange which provides support for an annular valve seat 26. Cooperating with the seat supporting gas conduit member 24 is a valve member 28 which is formed with a corrugated extension 30 which projects forwardly through the tubular projection 12 of the housing 10, and with a stem 31 which projects rearwardly through a perforated disk 34 mounted within the member 24. The valve member 28 is normally held against its seat by means of a compression spring 32 which is coiled about the valve stem 31 and is engaged at one end against a shoulder formed on the valve stem 33 and at its other end against the perforated disk 34. In order to maintain a gastight fit between the cylindrical gas conduit member 24 of the valve assembly and the housing 10, an annular groove 36 is formed in the internal periphery of the housing 10 to receive a rubber ring 38. Movement of the gas conduit member 24 in either direction tends to force the rubber ring against one or the other of the sloping sides of the groove to maintain a gas-tight seal between these parts.

The position of the cylindrical gas conduit member 24 is controlled by means of a valve control sleeve 42 which is integrally connected at its rear end to the member 24, and is arranged for sliding engagement with the housing 10. A heavy compression spring 44 coiled about the member 24 between the flanged rear end of the valve control sleeve 42 and a relatively stationary cap 45 tends to move the valve seat supporting member 24 and associated parts in a forward direction to open the valve. The cap 45 is screw-threaded to the rear end of a cylindrical cover 46 which forms the outside for the unit.

The mechanism for controlling the operation of the valve-coupling unit, comprises a bifurcated hand lever 48 which is mounted to turn upon two short shafts or trunnions 50, 52 mounted on a common transverse axis, and at their inner ends supported in bearings or seats 54, 56 formed in two recesses or flats located diametrically opposite one another in the side walls of the housing 10. The trunnions 50, 52 are further supported by means of disks 58, 60 which are fitted respectively into holes formed in the outer or cover casing 46, so that the housing 10 and the outer cover 46 are rigidly connected together to form the body portion of the valve-coupling unit. The trunnions 50, 52 have mounted thereon identical cams, each of which comprises an expanding gripper sleeve actuating cam segment 62 and a valve sleeve control segment 64. The operation of the valve-coupling unit is briefly as follows: For the fully retracted off position of the hand lever 48 and cam segments 62, 64 illustrated in Figs. 3 and 4, the gripper actuated sleeve 18 is permitted to be in its fully retracted position to which it is moved by the pressure exerted by the elastic collar 16. For this position of the parts, the valve control sleeve 42 is held in its fully retracted position against the pressure of the spring 44 so that the valve 28 and seat 26 are engaged to close the valve 28. With the parts in the condition described, the nose of the unit including the expandable collar 16 is inserted within the screw thread opening of the nipple to be coupled designated at 22 in Fig. 5. When the hand lever 48 is now moved to the operative on position of Figs. 5 and 6, the cam 62 first acts to advance the gripper actuating sleeve 18 to compress longitudinally and thereby to expand radially the gripper collar 16, which is thus brought firmly into engagement with the internal threads of the cooperating nipple 22, firmly coupling the unit to the nipple, and at the same time providing an effective seal to prevent the escape of gas. The operation of coupling and sealing the unit to the nipple will have been completed by the time the hand lever 48 is moved approximately one-half way to its operative on position. As the hand lever continues to move to the on position, the segmental cam 64 starts to ride away from the valve control sleeve 42 which is thus permitted to move forwardly under the pressure of its spring 44. Movement of control sleeve 42 and the seat supporting conduit member 24 to the left tends to carry with it the valve member 28 which is held against the seat by the influence of spring pressure 32 and the pressure of the gas until the extension 30 of the valve member 28 comes into contact with an adjacent interior portion of the nipple 22. The continued advance of the valve control sleeve 42 and seat supporting conduit member 24 as the hand lever 48 is moved to its fully extended on position of Fig. 5, now causes the seat 26 to ride away from the obstructed valve member 28 to open the valve. It will be understood that the moving of handle 48 to the on position is effective to open the valve and permit the escape of gas therefrom only in the event that the unit has been placed in position against the nipple prior to the manipulation of the hand lever, since otherwise, in the absence of any obstructions to the forward movement of the corrugated extension 30 and valve member 28, the valve member 28 will remain in its closed position in engagement with its seat 26.

Figs. 7, 8 and 9 of the drawings, illustrate an alternative form of the valve-coupling unit in which the operating cams associated with the hand lever 48 are arranged to move the shut-off valve positively in both directions, forwardly to its extended open position and rearwardly to its retracted closed position. With this form of the device, the heavy compression spring 44 has been eliminated, and a substantially smoother and easier operation of the hand lever has been made possible. The construction illustrated in Figs. 7, 8 and 9, comprises specifically a cylindrical casing 74 having its external diameter reduced along a portion of its length and at its forward end a small diameter tubular extension 76, to the outer end of which is screw-threaded a ring member 78. An expandable rubber collar 80 mounted on the extension 76 in abutting relation to the member 78 is arranged to be acted upon by a gripper control sleeve 82 having a forward end of reduced diameter slidably fitted over the extension 76 for engagement with the washer 80, and a rear portion of larger diameter to fit over the reduced forward end portion of the cylindrical casing 74. The enlarged portion of the sleeve 82 is cut away along a portion of its outer diameter to provide a thin-walled rearward extension 84.

The valve mechanism employed with this form of the device, comprises a valve seat supporting sleeve member 86, a seat 88, and a valve member 90 having a corrugated forward extension 92 which projects through the sleeve extension 76, and which is yieldably seated by means of a compression spring 94 engaged at one end against the valve member 90 and at its other end against the abutting end of a sleeve connection 96 between the sleeve 86 and the inlet housing or pipe to the coupling device. The sleeve member 86 is arranged to be actuated by means of a control sleeve 98 connected at its inwardly flanged rear end to the sleeve 86 between a shoulder 100 on the sleeve 86 and a screw-threaded collar 102 so that the control sleeve 98 moves axially as a unit with the sleeve 86. In this form of the device the valve control sleeve 98 is extended forwardly to overlap the rearward extension 84 of the gripper control sleeve 82.

The hand lever operated connections for controlling the position of the valve shown in Figs. 7, 8 and 9, comprises two trunnions 104, 105 which are screw-threaded into bearing lugs formed in opposite sides of the casing member 74, and which have pivotally supported on the outer ends thereof the bifurcated ends of a hand lever 106. Each of these trunnions has mounted thereon a cam block 110 as shown in Fig. 9, which is secured to the respective arm of hand lever 106, and is provided with two cam surfaces 112, 114 for controlling respectively the position of the gripper control sleeve 82 and the valve control sleeve 98. The cam surface 112 is arranged for engagement with the end of the reduced sleeve extension 84 of the gripper control sleeve 82. Each cam surface 114 is arranged for engagement within a slot formed in the control sleeve 98, so that rotation of the hand lever 106 and cams has the effect of moving the valve control sleeve 98 from one to the other of its fully retracted and advanced positions. The construction and arrangement of the cams is such that the movement of the hand lever 106 midway from its retracted position has the effect of engaging the cam surface 112 against the sleeve extension 84 so that the gripper control sleeve 82 is advanced to compress and thereby to bulge outwardly the rubber washer 80. During continued movement of the hand lever 106 from its intermediate to its extreme forward position, the cam 114 becomes operative to shift the valve control sleeve 98 to its forward position to open the valve. Conversely, the movement of the hand lever 106 midway from its on to its off position is effective to positively retract the valve control sleeve 98 to shut off the valve, and continued movement to the off position thereafter to permit a rearward movement of the gripper control sleeve 82 to release and to unseal the unit from the nipple.

The invention having been described, what is claimed is:

1. A detachable fluid valve-coupling unit having, in combination, a housing, an expandable gripper carried by the housing for gripping engagement with the internal periphery of the nipple to be coupled, a device for expanding said gripper, a fluid shut-off valve in the housing, a manually operable control element movable between an off and an on position, and means rendered operative by movement of said element for expanding the gripper to grip the nipple and to open the valve.

2. A detachable fluid valve-coupling unit having, in combination, a housing, an expandable gripper carried by the housing for gripping engagement with the internal periphery of the nipple to be coupled, a device for expanding said gripper, a fluid shut-off valve in the housing, a manually operable control element movable between an off and an on position, means rendered operative by movement of said element for expanding the gripper to grip the nipple, and means rendered operative by a further movement of said element to open the valve.

3. A detachable fluid valve-coupling unit having, in combination, a housing, an expandable gripper carried by the housing for gripping engagement with the internal periphery of the nipple to be coupled, a device for expanding said gripper, a fluid shut-off valve in the housing, a manually operable control element movable between an off and an on position, a cam and follower connection rendered operative by movement of said element for expanding said gripper to grip the nipple, and a second cam and follower connection rendered operative by the continued movement of said element to open the valve.

4. A detachable fluid valve-coupling unit having, in combination, a housing, an expandable gripper comprising a tubular fluid conduit member, a gripper of resilient material carried on said conduit member adapted to form a gas-tight seal in gripping engagement with the internal periphery of a nipple to be coupled, a fluid shut-off valve in the housing, and means under the control of the operator to expand the gripper to grip the nipple and to open the valve.

5. A detachable fluid valve-coupling unit having, in combination, a housing, an expandable gripper comprising a gripper of resilient material adapted to form a gas seal in gripping engagement with the internal periphery of the nipple, a valve assembly comprising valve and seating members shiftable longitudinally within the housing, means for yieldably maintaining said members in a relatively closed position, a manually operable control element movable between an off and an on position, means rendered operative by movement of said element for expanding said gripper and for moving said valve assembly forwardly in the housing, and an extension movable with said valve assembly adapted to be arrested by engagement with said nipple to be coupled to open the valve.

6. A detachable valve-coupling unit having, in combination, a housing, gripping means carried by the housing for gripping engagement with the nipple to be coupled comprising a tubular extension of said housing arranged to extend within the nipple to be coupled, a washer of elastic material adapted to be radially expanded on said tubular extension, a member shiftable axially on said tubular extension for compressing the washer endwise to effect radial expansion of the washer into gripping engagement with the internal periphery of the nipple, a shut-off valve in the housing, a manually operable control element movable between off and on positions, and means actuated by movement of said element to move said washer expanding member to grip the nipple and means actuated by the continued movement of said element to open the valve.

7. A detachable valve-coupling unit having, in combination, a housing, gripping means carried by the housing for gripping engagement with the nipple to be coupled comprising a tubular extension of said housing arranged to extend within the nipple to be coupled, a washer of elastic material adapted to be radially expanded on said tubular extension, a member shiftable axially on said tubular extension for compressing the washer endwise to effect radial expansion of the washer into gripping engagement with the internal periphery of the nipple, a shut-off valve in the housing, and a manually operable control element movable between off and on positions to grip the nipple and open the valve.

8. A detachable valve-coupling unit having, in combination, a housing, gripping means carried by the housing for gripping engagement with the nipple to be coupled comprising a tubular extension of said housing arranged to extend within the nipple to be coupled, a washer of elastic material adapted to be radially expanded on said tubular extension, and a sleeve element shiftable axially on said tubular extension to compress said washer endwise in order to expand said washer radially against the internal periphery of the nipple, a valve assembly in the housing comprising valve and valve seating members, means normally operative to maintain the valve closed, and means under the control of the operator for shifting said sleeve member to expand said washer against the nipple and thereafter to open said valve.

9. A detachable valve-coupling unit having, in combination, a housing, a tubular extension of said housing arranged to extend within the nipple to be coupled, a washer of elastic material adapted to be radially expanded on said tubular extension, a sleeve member shiftable to compress and thereby to expand said washer against the inner terminal periphery of the nipple, a valve assembly comprising a valve member, and a valve seat supporting fluid conduit member movable longitudinally within the said housing, one of said members having a forward extension arranged to be projected against the nipple, means arranged to act on the other of said members to advance said assembly to engage said forward extension against the nipple and thereafter to open the valve, spring means acting to relatively move said members to close the valve, and a hand lever shiftable from one to another position to actuate said gripping means and thereafter to open the valve.

10. A detachable valve-coupling unit having, in combination, a cylindrical housing, an expandable gripper carried by the housing arranged to be expanded into gripping engagement with the internal periphery of the nipple to be coupled, a valve assembly comprising valve and seating elements shiftable axially of the housing, a gripper control sleeve shiftable axially of the housing, a valve control sleeve shiftable axially of the housing, a control element rotatable on a transverse axis in said housing, and means rendered operative by rotation of said control element to control the axial position of each of said sleeves.

11. A detachable valve-coupling unit having, in combination, a cylindrical housing, a tubular extension of said housing arranged to extend within the nipple to be coupled, a washer of elastic material adapted to be radially expanded on said tubular extension, an element sleeved on said extension axially shiftable to compress the washer endwise in order to expand the washer radially against the internal periphery of the nipple, a valve assembly in the housing comprising a tubular fluid conduit defining member axially shiftable in the housing, and formed at its forward end with a valve seat, a cooperating tubular valve member having a stem projecting through said tubular extension of the housing, spring means for maintaining said conduit defining member and valve member in a relatively extended position in which the valve is closed, cam means acting on said conduit defining member for controlling the position thereof axially in the housing, means under the control of the operator for advancing said washer expanding member to grip the nipple, and means under the control of the operator operable thereafter for advancing said conduit defining member to engage said extended valve stem against an obstructing portion of the nipple and thereafter to open the valve.

12. A detachable valve-coupling unit having, in combination, a cylindrical housing, a tubular extension of said housing arranged to extend within the nipple to be coupled, a washer of elastic material adapted to be radially expanded on said tubular extension, a gripper control sleeve on said housing axially shiftable to compress the washer endwise in order to expand the washer radially against the internal periphery of the nipple, a valve assembly comprising valve and seating members shiftable longitudinally within the housing, spring means for yieldably maintaining said members in a relatively closed position, a valve control sleeve on the housing axially shiftable to move the valve assembly forwardly in the housing, an extension movable with said valve assembly adapted to be arrested by engagement with the nipple to be coupled to open the valve, a manually operable control member rotatable on a transverse axis on said housing, and cam means actuated thereby for shifting said control sleeves to expand said washer to grip the nipple and thereafter to advance said valve assembly.

13. A detachable valve-coupling unit having, in combination, a cylindrical housing, a tubular extension of said housing arranged to extend within the nipple to be coupled, a washer of elastic material adapted to be radially expanded on said tubular extension, a gripper control sleeve on said housing axially shiftable to compress the washer endwise in order to expand the washer radially against the internal periphery of the nipple, a valve assembly comprising a tubular fluid conduit defining valve seating member axially shiftable within the housing, a valve member seated therein having an extension arranged to project through said tubular extension of the housing, spring means for seating said valve member, an axially shiftable valve control sleeve on the housing connected to move said tubular fluid conduit defining valve seating member therewith, a manually operable control member rotatable on a transverse axis on said housing, and a gripper control sleeve actuating cam and a valve control sleeve actuating cam rotatable with the control member on said transverse axis.

ERIC MARTIN ANDERSON.
BEECHER OLEN KELSO.
CLARENCE MILTON GINN.

REFERENCES CITED

The following references are of record in the file of this patent:

UNITED STATES PATENTS

| Number | Name | Date |
|---|---|---|
| 620,520 | Welstead | Feb. 28, 1899 |